US011279346B2

(12) United States Patent
Gutmann et al.

(10) Patent No.: US 11,279,346 B2
(45) Date of Patent: *Mar. 22, 2022

(54) TRAFFIC SIGNAL RESPONSE FOR AUTONOMOUS VEHICLES

(71) Applicant: WAYMO LLC, Mountain View, CA (US)

(72) Inventors: Jens-Steffen Ralf Gutmann, Cupertino, CA (US); Andreas Wendel, Mountain View, CA (US); Nathaniel Fairfield, Mountain View, CA (US); Dmitri A. Dolgov, Los Altos, CA (US); Donald Jason Burnette, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 16/448,230

(22) Filed: Jun. 21, 2019

(65) Prior Publication Data
US 2019/0351897 A1 Nov. 21, 2019

Related U.S. Application Data

(63) Continuation of application No. 15/958,365, filed on Apr. 20, 2018, now Pat. No. 10,377,378, which is a
(Continued)

(51) Int. Cl.
*B60W 30/09* (2012.01)
*G08G 1/0962* (2006.01)
(Continued)

(52) U.S. Cl.
CPC ...... *B60W 30/09* (2013.01); *B60W 30/18154* (2013.01); *G08G 1/09623* (2013.01);
(Continued)

(58) Field of Classification Search
CPC ............ B60W 30/09; B60W 30/18154; G08G 1/09623; G08G 1/09626; G08G 1/096725
(Continued)

(56) References Cited

U.S. PATENT DOCUMENTS 4,814,765 A 3/1989 Deroche et al.
4,878,050 A 10/1989 Kelley
(Continued)

FOREIGN PATENT DOCUMENTS

CN 201153280 Y 11/2008
CN 101894479 A 11/2010
(Continued)

OTHER PUBLICATIONS

"Examination Report received for European Patent Application No. 11702743.3, dated Aug. 12, 2016", 9 pages.
(Continued)

*Primary Examiner* — Jack K Wang
(74) *Attorney, Agent, or Firm* — Botos Churchill IP Law

(57) ABSTRACT

Aspects of the disclosure relate to determining whether a vehicle should continue through an intersection. For example, the one or more of the vehicle's computers may identify a time when the traffic signal light will turn from yellow to red. The one or more computers may also estimate a location of a vehicle at the time when the traffic signal light will turn from yellow to red. A starting point of the intersection may be identified. Based on whether the estimated location of the vehicle is at least a threshold distance past the starting point at the time when the traffic signal light will turn from yellow to red, the computers can determine whether the vehicle should continue through the intersection.

24 Claims, 10 Drawing Sheets

Related U.S. Application Data continuation of application No. 15/618,461, filed on Jun. 9, 2017, now Pat. No. 10,005,460, which is a continuation of application No. 14/448,299, filed on Jul. 31, 2014, now Pat. No. 9,707,960.

(51) Int. Cl.
G08G 1/0967 (2006.01)
B60W 30/18 (2012.01)

(52) U.S. Cl.
CPC ... *G08G 1/09626* (2013.01); *G08G 1/096725* (2013.01); *B60W 2555/60* (2020.02); *G08G 1/096783* (2013.01); *G08G 1/096791* (2013.01)

(58) Field of Classification Search
USPC ......................................................... 340/907
See application file for complete search history.

(56) References Cited

U.S. PATENT DOCUMENTS

| | | | |
|---|---|---|---|
| 5,633,629 | A | 5/1997 | Hochstein |
| 6,018,697 | A | 1/2000 | Morimoto |
| 6,191,704 | B1 | 2/2001 | Takenaga |
| 6,628,804 | B1 | 9/2003 | Edanami |
| 7,398,076 | B2 | 7/2008 | Kubota et al. |
| 8,126,642 | B2 | 2/2012 | Trepagnier et al. |
| 8,559,673 | B2 | 10/2013 | Thrun et al. |
| 8,761,991 | B1 | 6/2014 | Ferguson et al. |
| 9,129,156 | B2 | 9/2015 | Herbschleb |
| 9,156,473 | B2 | 10/2015 | Clarke |
| 9,248,832 | B2 | 2/2016 | Huberman |
| 9,707,960 | B2 | 7/2017 | Gutmann et al. |
| 10,005,460 | B2 | 6/2018 | Gutmann et al. |
| 10,037,693 | B2 | 7/2018 | Ryu |
| 10,134,276 | B1 | 11/2018 | Barker |
| 10,235,885 | B2 | 3/2019 | An |
| 10,377,378 | B2 | 8/2019 | Gutmann et al. |
| 2002/0059017 | A1 | 5/2002 | Yamane |
| 2002/0080998 | A1 | 6/2002 | Matsukawa et al. |
| 2002/0101360 | A1 | 8/2002 | Schrage |
| 2004/0227647 | A1 | 11/2004 | Yanai |
| 2005/0187701 | A1 | 8/2005 | Baney |
| 2005/0273256 | A1 | 12/2005 | Takahashi |
| 2006/0009188 | A1 | 1/2006 | Kubota et al. |
| 2006/0197684 | A1 | 9/2006 | Tremblay |
| 2007/0046500 | A1 | 3/2007 | Herbert et al. |
| 2007/0047809 | A1 | 3/2007 | Sasaki |
| 2007/0176791 | A1 | 8/2007 | Bolotin |
| 2007/0257817 | A1 | 11/2007 | Mahoney |
| 2008/0071460 | A1 | 3/2008 | Lu |
| 2008/0170754 | A1 | 7/2008 | Kawasaki |
| 2008/0253615 | A1 | 10/2008 | Kubota et al. |
| 2009/0076698 | A1 | 3/2009 | Yokoyama |
| 2009/0303077 | A1 | 12/2009 | Onome et al. |
| 2010/0004839 | A1 | 1/2010 | Yokoyama et al. |
| 2010/0256836 | A1* | 10/2010 | Mudalige ............... G08G 1/164 701/2 |
| 2011/0037619 | A1 | 2/2011 | Ginsberg |
| 2011/0043378 | A1 | 2/2011 | Bailey et al. |
| 2011/0093178 | A1 | 4/2011 | Yamada et al. |
| 2011/0095906 | A1 | 4/2011 | Staehlin |
| 2011/0115646 | A1* | 5/2011 | Matsumura ...... G08G 1/096716 340/907 |
| 2011/0135155 | A1 | 6/2011 | Kudo |
| 2012/0022718 | A1 | 1/2012 | Neelakantan |
| 2012/0143395 | A1 | 6/2012 | Yamada |
| 2012/0288138 | A1 | 11/2012 | Zeng |
| 2013/0076538 | A1 | 3/2013 | Uno |
| 2013/0110315 | A1 | 5/2013 | Ogawa |
| 2013/0110371 | A1 | 5/2013 | Ogawa |
| 2013/0166109 | A1 | 6/2013 | Ginsberg |
| 2013/0211656 | A1 | 8/2013 | An |
| 2013/0253754 | A1 | 9/2013 | Ferguson |
| 2013/0325241 | A1 | 12/2013 | Lombrozo et al. |
| 2013/0335238 | A1 | 12/2013 | Matsur |
| 2014/0046509 | A1 | 2/2014 | Otake |
| 2014/0191882 | A1 | 7/2014 | Varma |
| 2014/0277901 | A1* | 9/2014 | Ferguson ............ G05D 1/0088 701/27 |
| 2015/0151751 | A1* | 6/2015 | Clarke .................... B60T 8/32 701/28 |
| 2015/0197248 | A1 | 7/2015 | Breed |
| 2015/0202770 | A1 | 7/2015 | Patron |
| 2015/0243164 | A1 | 8/2015 | Collum et al. |
| 2015/0254982 | A1 | 9/2015 | Goudy et al. |
| 2015/0294430 | A1 | 10/2015 | Huang |

FOREIGN PATENT DOCUMENTS

| | | | |
|---|---|---|---|
| CN | 102067193 | A | 5/2011 |
| CN | 102142197 | A | 8/2011 |
| CN | 102737505 | A | 10/2012 |
| CN | 103177590 | A | 6/2013 |
| CN | 103208200 | A | 7/2013 |
| CN | 203134139 | U | 8/2013 |
| CN | 103390349 | A | 11/2013 |
| CN | 103911928 | A | 7/2014 |
| EP | 1220182 | A2 | 7/2002 |
| EP | 2034271 | A1 | 3/2009 |
| JP | S52029593 | A | 3/1977 |
| JP | H03271999 | A | 12/1991 |
| JP | H08329384 | A | 12/1996 |
| JP | H1153686 | A | 2/1999 |
| JP | 11250399 | A | 9/1999 |
| JP | H11325936 | A | 11/1999 |
| JP | 2001052297 | A | 2/2001 |
| JP | 2001307288 | A | 11/2001 |
| JP | 2002259969 | A | 9/2002 |
| JP | 2004163353 | A | 6/2004 |
| JP | 2005004516 | A | 1/2005 |
| JP | 2005202761 | A | 7/2005 |
| JP | 2005216086 | A | 8/2005 |
| JP | 2006072830 | A | 3/2006 |
| JP | 2006131055 | A | 5/2006 |
| JP | 2006139707 | A | 6/2006 |
| JP | 2007072987 | A | 3/2007 |
| JP | 2007241469 | A | 9/2007 |
| JP | 2007263737 | A | 10/2007 |
| JP | 2007320458 | A | 12/2007 |
| JP | 2008002906 | A | 1/2008 |
| JP | 2008296783 | A | 12/2008 |
| JP | 2008299666 | A | 12/2008 |
| JP | 2008299758 | A | 12/2008 |
| JP | 2009025902 | A | 2/2009 |
| JP | 2009122943 | A | 6/2009 |
| JP | 2009151801 | A | 7/2009 |
| JP | 2010530997 | A | 9/2010 |
| JP | 2011065235 | A | 3/2011 |
| JP | 2011227833 | A | 11/2011 |
| JP | 2013097620 | A | 5/2013 |
| JP | 2013104815 | A | 5/2013 |
| JP | 2013186684 | A | 9/2013 |
| KR | 20090124535 | A | 12/2009 |
| KR | 20100070163 | A | 6/2010 |
| KR | 20130007754 | A | 1/2013 |
| WO | 9735743 | A1 | 10/1997 |
| WO | 2007102065 | A1 | 9/2007 |
| WO | 2012157048 | A1 | 11/2012 |

OTHER PUBLICATIONS

"Extended European Search Report received for European Patent Application No. 15827437.3, dated Mar. 21, 2018", 8 pages.

Lawitzky, et al., "Energy Optimal Control to Approach Traffic Lights", 2013 IEEE/RSJ International Conference on Intelligent Robots and Systems {IROS), Tokyo, Japan., Nov. 3-7, 2013, 6 pages.

"International Search Report and Written Opinion received for PCT Patent Application No. PCT/US2011/021797, dated Jun. 1, 2011".

(56) References Cited

OTHER PUBLICATIONS

"International Search Report and Written Opinion received for PCT Patent Application No. PCT/US2015/040698, dated Oct. 30, 2015".
"Notice of Preliminary Rejection received for Korean Patent Application No. 1020177000913, dated Jun. 14, 2018".
"Notice of Reasons for Rejection received for Japanese Patent Application No. 2017501372, dated Jan. 30, 2018", 11 pages.
"Office Action received for Chinese Patent Application No. 201180009746.3, dated Feb. 2, 2015", 9 pages.
"Office Action received for Chinese Patent Application No. 201580038127.5, dated Dec. 27, 2018".
"Office Action received for Japanese Patent Application No. 2012550099, dated Feb. 3, 2015".
Jaffe, Eric , "The First Look at How Google's Self-Driving Car Handles City Streets", The Atlantic City Lab, Apr. 28, 2014, 16 pages.
Republic of Korea Notice of Allowance for Application No. 10-2019-7008015 dated Nov. 16, 2020.
Republic of Korea Notice of Last Preliminary Rejection for Application No. 10-2020-7005079 dated Oct. 22, 2020.
Republic of Korea Second Notice of Final Rejection for Application No. 10-2019-7008015 dated Jan. 20, 2020.
Decision of Grant for application No. JP2018-091058 dated Aug. 29, 2019.
Japanese Office Action issued in Application No. JP2018-091058 dated May 29, 2019.
Korean Office Action for Application No. KR10-2019-7008015 dated May 9, 2019.
Notice of Reasons for Rejection for Japanese Patent Application No. 2019-176562, dated Aug. 18, 2021.
The First Office Action for Chinese Patent Application No. 201910763077.7, dated Jan. 5, 2021.

\* cited by examiner

TRAFFIC SIGNAL RESPONSE FOR AUTONOMOUS VEHICLES

CROSS-REFERENCES TO RELATED APPLICATIONS

The present application is a continuation of U.S. patent application Ser. No. 15/958,365, filed on Apr. 20, 2018, which is a continuation of U.S. patent application Ser. No. 15/618,461, filed on Jun. 9, 2017, now U.S. Pat. No. 10,005,460, issued on Jun. 26, 2018, which is a continuation of U.S. patent application Ser. No. 14/448,299, filed on Jul. 31, 2014, now U.S. Pat. No. 9,707,960, issued on Jul. 18, 2017, the disclosures of which are hereby incorporated herein by reference.

BACKGROUND

Autonomous vehicles, such as vehicles which do not require a human driver, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. Autonomous vehicles may also use the cameras, sensors, and global positioning devices to gather and interpret images and sensor data about its surrounding environment, e.g., parked cars, trees, buildings, etc.

Information from the perception system may be combined with highly detailed map information in order to allow a vehicle's computer to safely maneuver the vehicle in various environments. This highly detailed map information may describe expected conditions of the vehicle's environment such as the shape and location of roads, traffic signals, and other objects. In this regard, the information from the perception system and detailed map information may be used to assist a vehicle's computer in making driving decisions involving intersections and traffic signals.

BRIEF SUMMARY

One aspect of the disclosure provides a method. The method includes identifying, by one or more computing devices, a time when the traffic signal light will turn from yellow to red; estimating, by the one or more computing devices, a location of a vehicle at the estimated time that the traffic signal light will turn from yellow to red; identifying, by the one or more computing devices, a starting point of an intersection associated with the traffic signal light; determining, by the one or more computing devices, whether the estimated location of the vehicle will be at least a threshold distance past the starting point; and when the estimated location of the vehicle is determined to be at least a threshold distance past the starting point, determining, by the one or more computing devices, that the vehicle should continue through the intersection.

In one example, the method also includes, when the estimated location of the vehicle is determined not to be at least a threshold distance past the starting point, determining that the vehicle should stop at or before the starting point. In another example, the method also includes identify a time when a traffic signal light turned from green to yellow, identifying a length of time that the traffic signal light will remain yellow, and identifying the time when the traffic signal light will turn from yellow to red is based on the time when a traffic signal light turned from green to yellow and a length of time that the traffic signal light will remain yellow. In this example, identifying the length of time include calculating the length of time based on a speed limit of a roadway on which the vehicle is traveling. Alternatively, identifying the length of time includes retrieving a default value. In another alternative, identifying the length of time includes accessing a plurality of lengths of times for various traffic signal lights and retrieving a value corresponding to the traffic signal light. In another example, the method also includes, after determining that the vehicle should go through the intersection, estimating, a second location of the vehicle at the time that the traffic signal will turn red, and determining whether the estimated second location of the vehicle will be at least a second threshold distance past the starting point. In this example, the second threshold distance is less than the threshold distance. In another example, the estimated location of the vehicle corresponds to an estimated location of a portion of the vehicle proximate to the rear of the vehicle. In another example, identifying the time when the traffic signal light will turn from yellow to red is based on information received from a device remote from the vehicle.

Another aspect of the disclosure includes a system having one or more computing devices. The one or more computing devices are configured to identify a time when the traffic signal light will turn from yellow to red; estimate a location of a vehicle at the estimated time that the traffic signal light will turn from yellow to red; identify a starting point of an intersection associated with the traffic signal light; determine whether the estimated location of the vehicle will be at least a threshold distance past the starting point; and when the estimated location of the vehicle is determined to be at least a threshold distance past the starting point, determine that the vehicle should continue through the intersection.

In one example, the one or more computing devices are also configured to, when the estimated location of the vehicle is determined not to be at least a threshold distance past the starting point, determine that the vehicle should stop at or before the starting point. In another example, the one or more computing devices are also configured to identify a time when a traffic signal light turned from green to yellow; identify a length of time that the traffic signal light will remain yellow; and identify the time when the traffic signal light will turn from yellow to red based on the time when a traffic signal light turned from green to yellow and a length of time that the traffic signal light will remain yellow. In this example, the one or more computing devices are further configured to identify the length of time by calculating the length of time based on a speed limit of a roadway on which the vehicle is traveling. Alternatively, the one or more computing devices are also configured to identify the length of time by retrieving a default value. In another alternative, the one or more computing devices are also configured to identify the length of time by accessing a plurality of lengths of times for various traffic signal lights and retrieving a value corresponding to the traffic signal light. In another example, the one or more computing devices are also configured to, after determining that the vehicle should go through the intersection, estimate, a second location of the vehicle at the time that the traffic signal will turn red and determine whether the estimated second location of the vehicle will be at least a second threshold distance past the starting point. In this example, the second threshold distance is less than the threshold distance. In another example, the estimated location of the vehicle corresponds to an estimated location of a portion of the vehicle proximate to the rear of the vehicle. In another example, the one or more computing devices are further configured to identify the time when the traffic signal light will turn from yellow to red based on information received from a device remote from the vehicle.

A further aspect of the disclosure provides a non-transitory, tangible computer-readable storage medium on which computer readable instructions of a program are stored. The instructions, when executed by one or more processors, cause the one or more processors to perform a method. The method includes identifying a time when the traffic signal light will turn from yellow to red; estimating a location of a vehicle at the estimated time that the traffic signal light will turn from yellow to red; identifying a starting point of an intersection associated with the traffic signal light; determining whether the estimated location of the vehicle will be at least a threshold distance past the starting point; and when the estimated location of the vehicle is determined to be at least a threshold distance past the starting point, determining that the vehicle should continue through the intersection.

In one example, the method also includes, when the estimated location of the vehicle is determined not to be at least a threshold distance past the starting point, determining that the vehicle should stop at or before the starting point. In another example, the method also includes identify a time when a traffic signal light turned from green to yellow, identifying a length of time that the traffic signal light will remain yellow, and identifying the time when the traffic signal light will turn from yellow to red is based on the time when a traffic signal light turned from green to yellow and a length of time that the traffic signal light will remain yellow. In this example, identifying the length of time include calculating the length of time based on a speed limit of a roadway on which the vehicle is traveling. Alternatively, identifying the length of time includes retrieving a default value. In another alternative, identifying the length of time includes accessing a plurality of lengths of times for various traffic signal lights and retrieving a value corresponding to the traffic signal light. In another example, the method also includes, after determining that the vehicle should go through the intersection, estimating, a second location of the vehicle at the time that the traffic signal will turn red, and determining whether the estimated second location of the vehicle will be at least a second threshold distance past the starting point. In this example, the second threshold distance is less than the threshold distance. In another example, the estimated location of the vehicle corresponds to an estimated location of a portion of the vehicle proximate to the rear of the vehicle. In another example, identifying the time when the traffic signal light will turn from yellow to red is based on information received from a device remote from the vehicle.

DETAILED DESCRIPTION OVERVIEW

Figure 1:
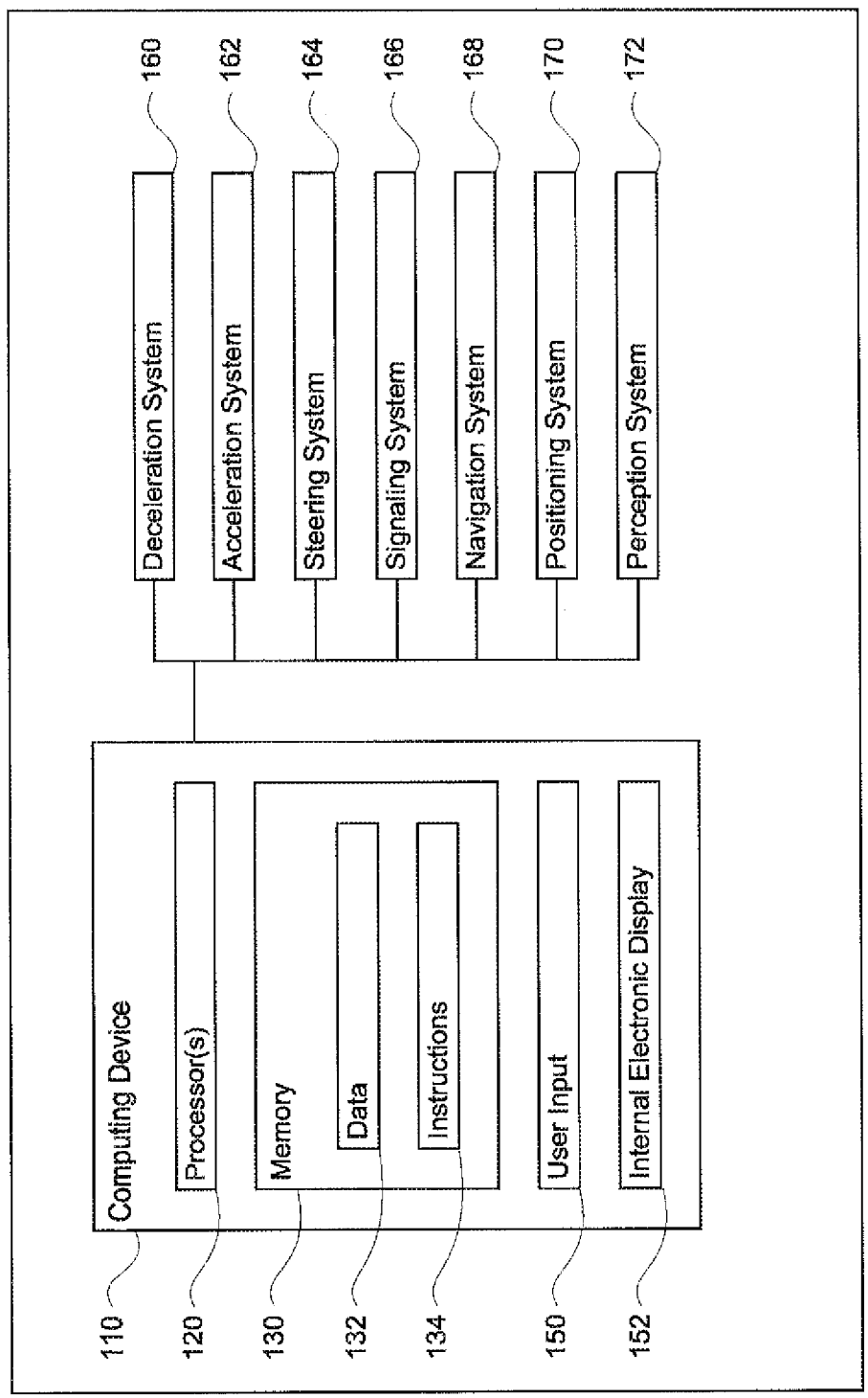
FIG. 1 is a functional diagram of a system in accordance with aspects of the disclosure.

The technology relates to determining whether an autonomous vehicle, or a vehicle driving in an autonomous mode, should proceed through or stop in response to a yellow traffic light. The case of a yellow light can be especially difficult to address. For example, simply braking for all yellow lights may not be a good decision; if there are other vehicles in the vicinity, in particular those behind the autonomous vehicle, such other vehicles may not expect a sudden stop when there is still time to pass through the light. This could then lead to accidents. Other factors which can complicate determining a response may include whether there are other vehicles in front of the autonomous vehicle which are moving slowly, but have already reached an intersection when the traffic signal turns yellow. In such a case, proceeding through the intersection may cause the autonomous vehicle to drive into the intersection when the traffic signal is actually red. Accordingly, the features described herein address how a computer can determine whether the autonomous vehicle should continue through a traffic intersection when a traffic signal has turned red.

An autonomous vehicle's one or more computing devices may identify the state of a traffic signal using any known techniques. For example, using a combination of sensor data and detailed map information, the computers may estimate an approximate location of a traffic signal. Then using templates, image matching color detection in images, etc. the computers may determine the state of a traffic signal (red, yellow, or green). Alternatively, this information may be received from another device, such as a transmitter associated with a traffic signal light and/or from another vehicle which has made the determination. As such, the computers may also determine when the traffic signal turns from green to yellow using any of the examples above.

In one aspect the decision on whether to stop at a yellow traffic signal may be based on how much braking the vehicle would need to exercise, in order to come to a stop before the intersection. For example, if the required deceleration to stop the vehicle in a given distance to a traffic intersection is larger than a threshold, the vehicle's computers may determine that the vehicle should continue through the intersection. If not, the vehicle's computers may stop the vehicle before the intersection. While such logic works reasonably well for many scenarios, it can fail in situations when the autonomous vehicle (1) is already braking (and thus braking a bit more would allow the autonomous vehicle to come to a stop), (2) is accelerating (and thus changing to hard braking is unreasonable), or (3) the light turns red well before reaching the intersection, but the autonomous vehicle decided to go through based on the above logic.

In order to address such issues, additional factors may be taken into consideration. For example, when approaching a traffic signal, the autonomous vehicle's computers may identify a time when the traffic signal will turn red. For example, this time may be estimated by the computer by access pre-stored information regarding the length of time a yellow traffic signal will remain yellow. This information may be a default estimation value, a measured value for the particular traffic signal or intersection, or mathematically based on a speed limit for the road on which the autonomous vehicle is currently traveling. Alternatively, this length of time or a future time when the light will turn from yellow to red may be received from another device, such as a transmitter associated with a traffic signal light and/or from another vehicle which has made the determination.

The vehicle's computers may also determine a speed profile for the vehicle. This speed profile may be determined iteratively for a brief period of time in the future using any number of constraints including, but not limited to, road speed limit, curvature along trajectory of the autonomous vehicle, minimum and maximum acceleration the autonomous vehicle can execute, smoothness of acceleration, as well as other traffic participants along the trajectory. For example, a speed profile may be determined by analyzing all constraints for every second for the next 20 seconds or so as cost functions, where each cost function would be a lower value if the autonomous vehicle is in a desirable state and a higher value otherwise. By summing each of the cost function values, the computers may select the speed profile having the lowest total cost value. Non-linear optimization may allow for the determination of a solution in a short period of time. In addition, a speed profile computed in a previous iteration of the decision logic may also be used to determine a current speed profile. This can save time for making the decision more quickly as the speed profile usually does only change little if the overall traffic situation does not change abruptly.

Using the speed profile, the computers may estimate a future location of the autonomous vehicle at the time when the traffic signal will change from yellow to red. This time may be determined using the information regarding the length of time a yellow traffic signal will remain yellow as well as the time when the computers determined that the traffic signal changed from green to yellow. Then using this length of time and the speed profile, the computers may estimate where the autonomous vehicle will be located when the traffic signal light will change from yellow to red. Alternatively, if the vehicle's computer receives information identifying a future time when a traffic signal light will turn from yellow to red from another device, this future time may be used to estimate where the autonomous vehicle will be located when the traffic signal light will change from yellow to red.

The estimated future location may be determined using a reference location relative to the autonomous vehicle. For example, this reference location may be a most rear facing point on the autonomous vehicle, a point in the center of a rear axle of the autonomous vehicle, point or plane of a rear bumper of the autonomous vehicle, etc. In some examples, the reference may be selected based upon a legal requirement, such as a requirement that a vehicle's rear wheels be within an intersection before a traffic signal turns red. In such an example, the point or reference may include a point on one of the rear tires or a plane extending between the rear tires.

Using the estimated future location, the computers may determine whether the reference location will reach a certain location within the intersection when the traffic signal will change from yellow to red. For example, the detailed map information may define locations where the intersection starts and ends as well as threshold information. Alternatively, the location of the intersection may be determined by the vehicle's computer using sensor information, such as data from a camera and/or laser, to detect typical features of an intersection such as a white stop line, the location of traffic signals, or locations at which one or more other roadways meeting with the roadway on which the vehicle is driving. This information may be used to identify a location defining a starting point for the intersection where the vehicle should stop, such as no further than the first traffic signal at an intersection. If the estimated location of the vehicle is at least a threshold distance into the intersection and from the location defining the starting point of the intersection, the autonomous vehicle may continue through the intersection. If not, the autonomous vehicle may stop.

The threshold distance may initially be a pre-determined distance. However, as the vehicle moves closer to the intersection, because of the possibility of changes to the speed profile based on other factors (such as other vehicles, etc.), this threshold may actually decrease as the autonomous vehicle approaches the intersection.

The aspects described herein thus allow for the autonomous vehicle's computers to make decisions about whether to enter an intersection in response to a yellow traffic signal. Again, such aspects also allow the autonomous vehicle to comply with legal requirements that require a vehicle to have its rear-most axle within an intersection when a traffic signal turns red.

EXAMPLE SYSTEMS

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152. In this regard, internal electronic display 152 may be located within a cabin of vehicle 100 and may be used by computing device 110 to provide information to passengers within the vehicle 100.

In one example, computing device 110 may be an autonomous driving computing system incorporated into vehicle 100. The autonomous driving computing system may capable of communicating with various components of the vehicle as needed in order to control the vehicle in fully autonomous (without input from a driver) as well as semi-automonus (some input from a driver) driving modes.

Figure 2:
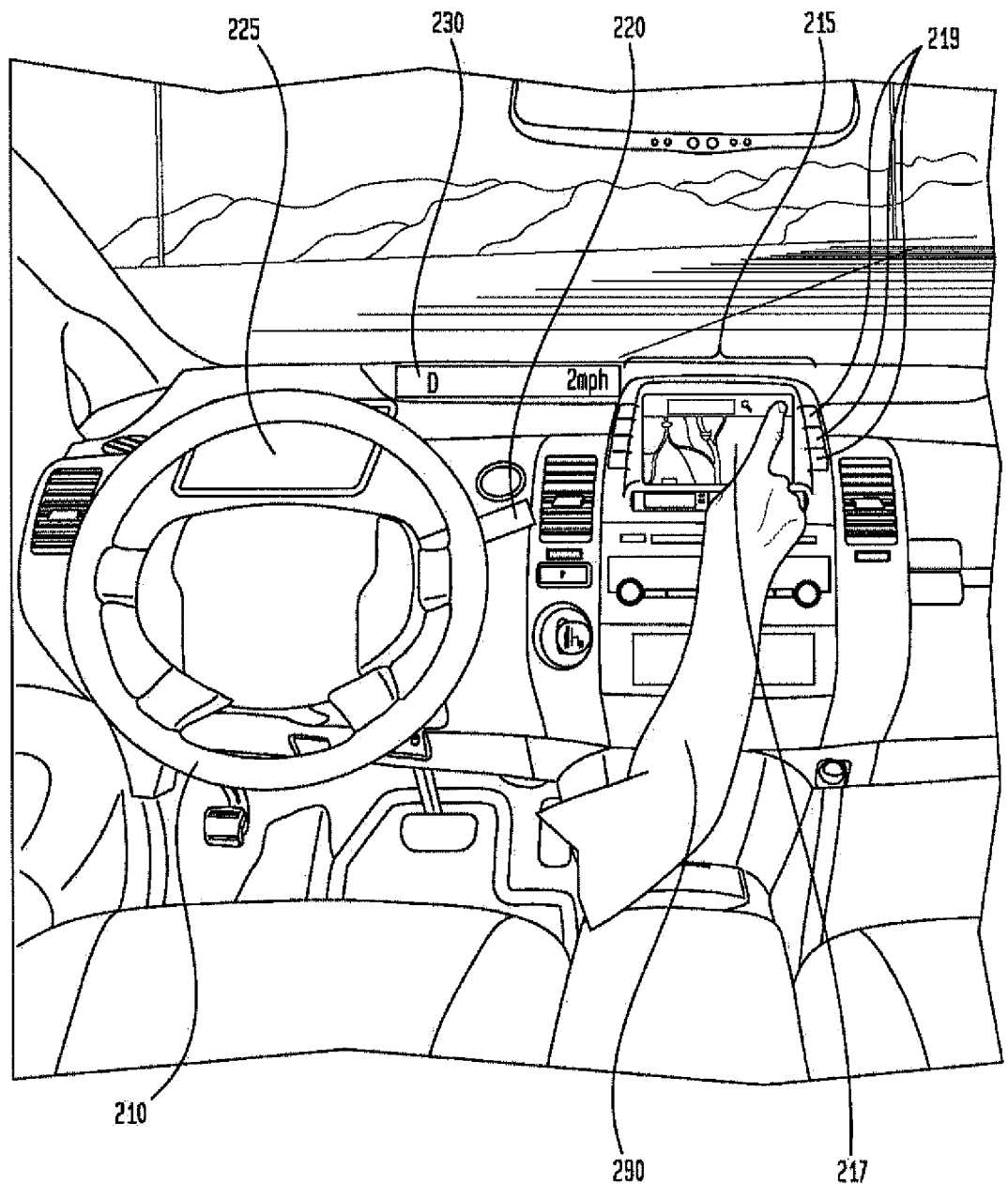
FIG. 2 is an interior of an autonomous vehicle in accordance with aspects of the disclosure.

As an example, FIG. 2 depicts an interior design of a vehicle having autonomous, semiautonomous, and manual (continuous input from a driver) driving modes. In this regard, the autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (again, which may be a part of electronic display 152), or button inputs 219, for activating or deactivating one or more autonomous driving modes and for enabling a driver or passenger 290 to provide information, such as a navigation destination, to the computing device 110.

Returning to FIG. 1, when engaged, computer 110 may control some or all of these functions of vehicle 100 and thus be fully or partially autonomous. It will be understood that although various systems and computing device 110 are shown within vehicle 100, these elements may be external to vehicle 100 or physically separated by large distances.

In this regard, computing device 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps identifying the shape and elevation of roadways, lane lines, intersections, crosswalks, speed limits, traffic signals, buildings, signs, real time traffic information, vegetation, or other such objects and information.

Figure 3:
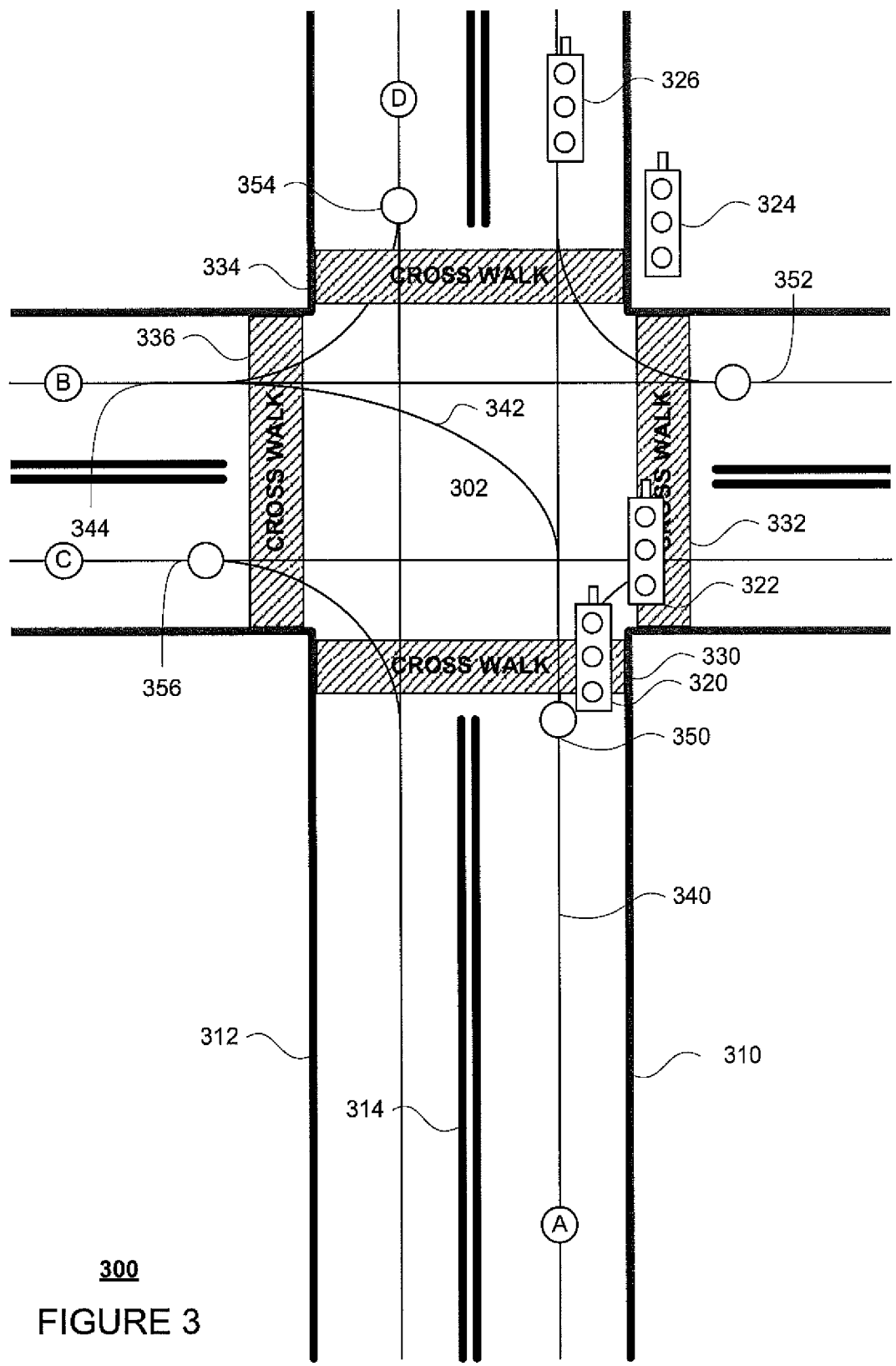
FIG. 3 is an example of detailed map information in accordance with aspects of the disclosure.

FIG. 3 is an example of detailed map information 300 for a section of roadway including an intersection 302. In this example, the detailed map information 300 includes information identifying the shape, location, and other characteristics of lane lines 310, 312, 314, traffic signals 320, 322, 324, 326, crosswalks 330, 332, 334, 336. Although the examples herein relate to a simplified three-light, three-state traffic signals (e.g, a green light state indicating that a vehicle can proceed through an intersection, a yellow light state indicating a transition state where the vehicle can proceed with caution but may need to stop at an intersection, and a red light state indicating that the vehicle should stop before the intersection, etc.), other types of traffic signals, such as those for right or left turn only lanes may also be used.

In addition, the detailed map information includes a network of rails 340, 342, 344, which provide the vehicle's computer with guidelines for maneuvering the vehicle so that the vehicle follows the rails and obeys traffic laws. As an example, a vehicle's computer may maneuver the vehicle from point A to point B (two fictitious locations not actually part of the detailed map information) by following rail 340, transitioning to rail 342, and subsequently transitioning to rail 344 in order to make a left turn at intersection 302.

The detailed map information 300 may also include a number of markers 350, 352, 354, and 356 which indicate the beginning of a traffic intersection or the point by which the vehicle must be stopped if traffic signal corresponding to the vehicle's current lane were to be signaling a red light. For simplicity, additional details, such as additional traffic signals and rails, of the intersection 302 are not shown. Although the example herein is shown pictorially for a right-lane drive location, the detailed map information may be stored in any number of different ways including databases, roadgraphs, etc. and may include maps of left-lane drive locations as well.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting and performing analysis on objects external to the vehicle such as other vehicles, obstacles in the roadway, traffic signals, signs, trees, etc. For example, the perception system 172 may include lasers, sonar, radar, one or more cameras, or any other detection devices which record data which may be processed by computing device 110. In the case where the vehicle is a small passenger vehicle such as a car, the car may include a laser mounted on the roof or other convenient location as well as other sensors such as cameras, radars, sonars, and additional lasers. The computing device 110 may control the direction and speed of the vehicle by controlling various components. By way of example, if the vehicle is operating completely autonomously, computing device 110 may navigate the vehicle to a location using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Figure 4:
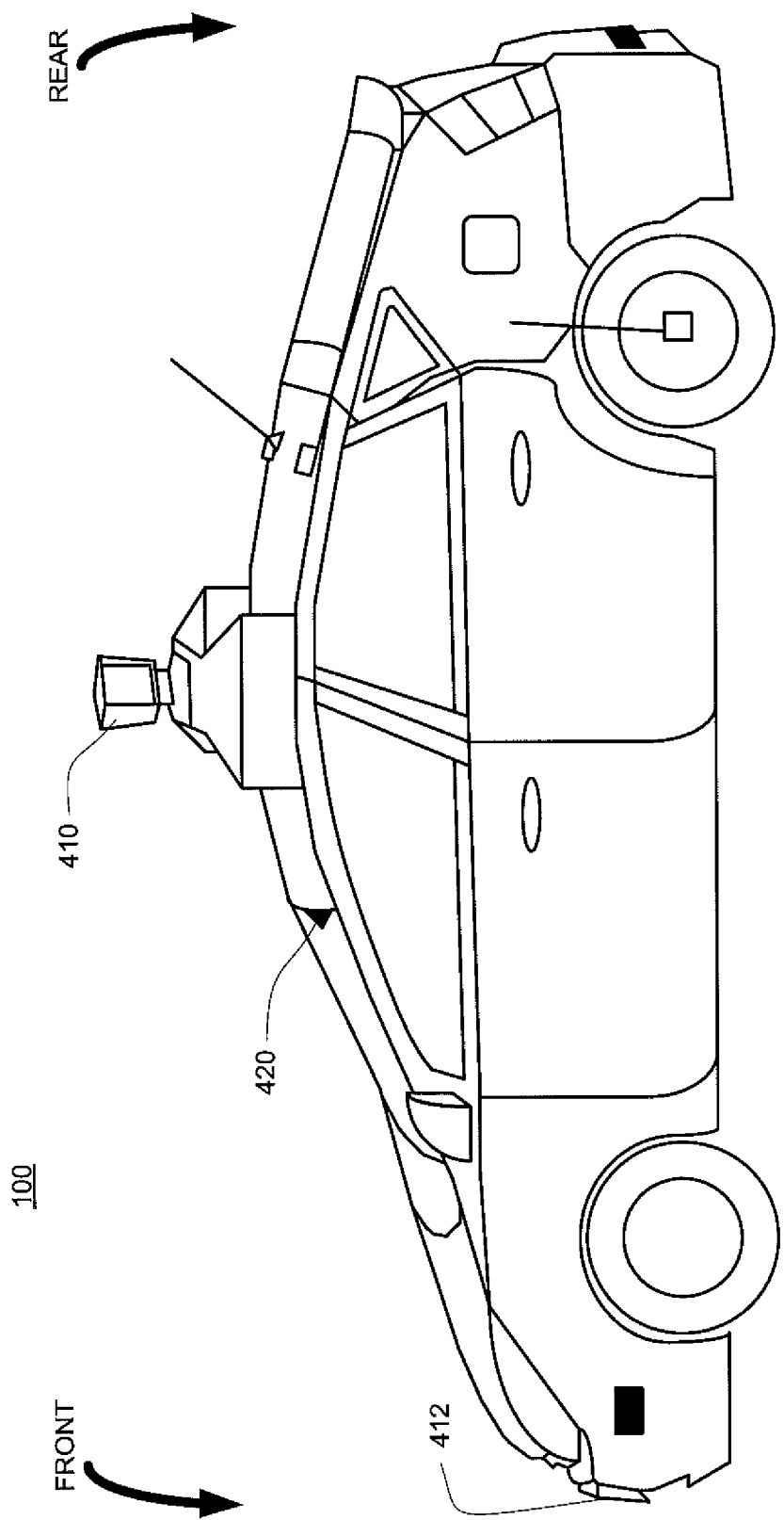
FIG. 4 is an exterior of an autonomous vehicle in accordance with aspects of the disclosure.

FIG. 4 is an example external view of vehicle 100 described above. As shown, various components of the perception system 172 may be positioned on or in the vehicle 100 in order to better detect external objects while the vehicle is being driven. In this regard, one or more sensors, such as laser range finders 410 and 412 may be positioned or mounted on the vehicle. As an example, the one or more computing devices 110 (not shown) may control laser range finder 410, e.g., by rotating it 180 degrees. In addition, the perception system may include one or more cameras 420 mounted internally on the windshield of vehicle 100 to receive and analyze various images about the environment. In addition to the laser range finder 410 is positioned on top of perception system 172 in FIG. 4, and the one or more cameras 420 mounted internally on the windshield, other detection devices, such as sonar, radar, GPS, etc., may also be positioned in a similar manner.

The one or more computing devices 110 may also include features such as transmitters and receivers that allow the one or more devices to send and receive information to and from other devices. For example, the one or more computing devices may determine information about the current status of a traffic signal light as well as information about when the status of the traffic signal light changes (from green to yellow to red to green). The one or more computing devices may send this information to other computing devices associated with other vehicles. Similarly, the one or more computing devices may receive such information from other computing devices. For example, the one or more computing devices may receive information about the current status of a traffic signal light as well as information about when the status of the traffic signal light changes from one or more other computing devices associated with other autonomous or non-autonomous vehicles. As another example, the one or more computing devices may receive such information with devices associated with the traffic signal lights. In this regard, some traffic signal lights may include transmitters that send out information about the current status of a traffic signal light as well as information about when the status of the traffic signal light changes.

This information may be sent and received via any wireless transmission method, such as radio, cellular, Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces.

EXAMPLE METHODS

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
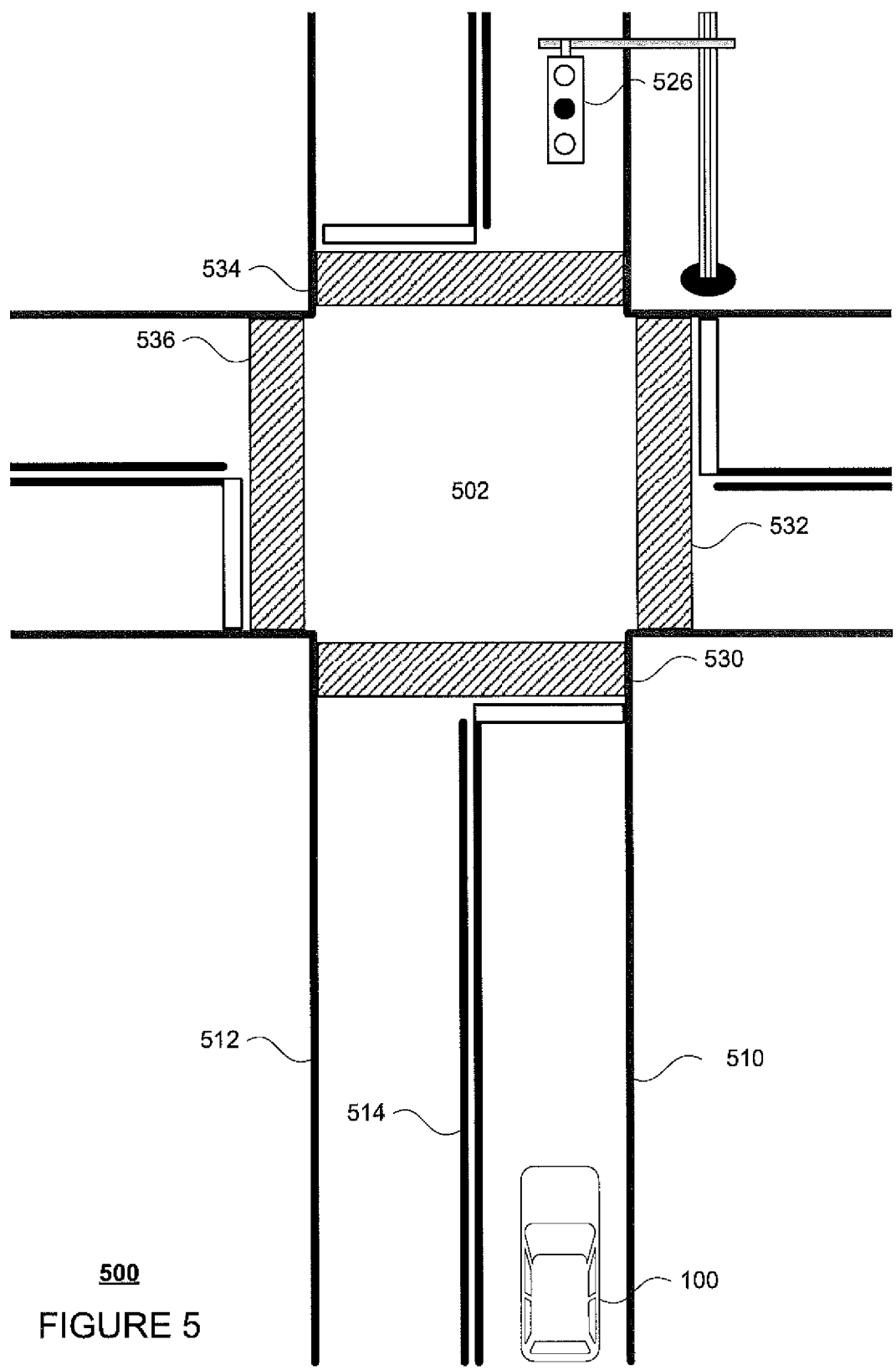
FIG. 5 is an example diagram of a section of roadway including an intersection in accordance with aspects of the disclosure.

As noted above, a vehicle's one or more computing devices may maneuver the vehicle using the various systems described above. For example, FIG. 5 depicts a section of roadway 500 including an intersection 502. Vehicle 100 is approaching intersection 502 and may be controlled, for example by one or more computing device 110 in an autonomous driving mode as described above.

In this example, intersection 502 corresponds to the intersection 302 of the detailed map information 300. In this regard, lane lines 510, 512, and 514 correspond to the shape, location, and other characteristics of lane lines 310, 312, and 314, respectively. Similarly crosswalks 530, 532, 534, and 536 correspond to the shape, location, and other characteristics of crosswalks 330, 332, 334, and 336, respectively and traffic signal 526 corresponds to the shape, location, and other characteristics of traffic signal 326. For simplicity, only a single traffic signal 526 is shown, though other traffic signals corresponding to the shape, location, and other characteristics of traffic signals 320, 322, and 324 may also exist.

An autonomous vehicle's one or more computing devices may identify the state of a traffic signal using any known techniques. For example, using a combination of sensor data and the expected location of traffic signals in the detailed map information, the computers may estimate an approximate location of a traffic signal related to the location of a vehicle. For example, returning to FIG. 3, when a vehicle is at point A (corresponding to the location of vehicle 100 in FIG. 5), the vehicle's computer may access the detailed map information in order to determine that traffic signals 320, 322, 324, and 326 are all relevant to the position of the vehicle 100. Thus, all other traffic signals, such as those that would be relevant to a vehicle positioned at points B or C in FIG. 3 (two additional fictitious locations not actually part of the detailed map information) may be ignored. Then using templates, image matching color detection in images, etc. the computers may determine the state of these traffic signals (red light, yellow light, or green light). Alternatively, the locations of traffic signals may be estimated solely from the sensor data, and without reference to detailed map information. As another example, the locations of traffic signals may be received from another device, such as a transmitter associated with a traffic signal light and/or from another vehicle which has made the determination.

The one or more computing devices 110 may also identify when the traffic signals change state. For example, the vehicle's one or more computing devices 110 may monitor the state of these traffic signals over a brief period of time to determine when the traffic signal changes state. In the example of FIG. 5, the vehicle's one or more computing devices may estimate a time when the traffic signal changes states based on the information used to identify the state of the traffic signals. For example, using timestamp information associated with the images captured by the vehicle's cameras several times per second, the vehicle's one or more computing devices may estimate a time when a traffic signal changes state from one light color to another, such as from a green light state to a yellow light state (green to yellow). This information may then be used to determine whether to stop the vehicle (because the traffic signal light may eventually turn red) or continue through the intersection without stopping. Alternatively, the time when a traffic signal changes state from one light color to another may be received from another device, such as a transmitter associated with a traffic signal light and/or from another vehicle which has made the determination.

The vehicle's one or more computing devices may determine whether to continue through or to stop at an intersection when a relevant traffic signal is in the yellow light state based on how much braking power would be required to stop the vehicle by the intersection. For example returning to FIG. 3, if "d" is the remaining distance between point A and marker 350 (which indicates the beginning of intersection 302), and "v" is the current speed of vehicle 100 then the required deceleration "a" to stop is given as a $=0.5\ v^2/d$. In this example, if v is in meters per second and d is in meters, then the deceleration a will be in meters per second squared. The vehicle's one or more computing devices 110 may compare the deceleration a to a threshold value to determine whether the vehicle should go through the intersection. The threshold value may be selected based upon a comfortable breaking power for a passenger of the vehicle. Too much deceleration may be scary for a passenger (e.g. it would be as if a driver were to "slam" on the breaks in order to stop at an intersection). Thus, if this deceleration a is larger than the threshold, the vehicle's one or more computing devices 110 may allow the vehicle to continue through the intersection, and if not, the vehicle's one or more computing devices may stop the vehicle.

In other examples, additional factors may be taken into consideration when the vehicle's one or more computing devices are determining whether to continue through an intersection when a relevant traffic signal is in a yellow light state. For example, when approaching a traffic signal, the autonomous vehicle's one or more computing devices 110 may identify a time when the traffic signal light will change from the yellow light state to the red light state (yellow to red).

In one instance, the computer may first identify a length of time that a traffic signal will remain in the yellow light state. This may include accessing information regarding the length of time a yellow traffic signal will remain yellow. This information may be a default estimation value (e.g., always 2.5 seconds), a measured value for the particular traffic signal or intersection (e.g., specific to traffic signal 326), or mathematically based on a speed limit for the road on which the vehicle 100 is currently traveling. As an example, on a 25 mile per hour road, traffic signal lights may have a period yellow light on the order of less than 4 seconds, whereas on a 35 mile per hour road, the traffic signal lights may have a longer period yellow light, such as 4 or more seconds. Alternatively, this information may be received from another device, such as a transmitter associated with a traffic signal light and/or from another vehicle which has made the determination.

Based on the identified length of time, the vehicle's one or more computing devices may identify a time when the traffic signal will turn from the yellow light state to a red light state (yellow to red). This may be done by simply adding the identified length of time to the estimated time when the traffic signal turned from the green light state to the yellow light state. Alternatively, a future time when the traffic signal will turn from the yellow light state to a red light state may be received from another device, such as a transmitter associated with a traffic signal light and/or from another vehicle which has made the determination.

The vehicle's one or more computing devices may also determine a speed profile for the vehicle. A speed profile may describe an expected future speed and in some cases an expected future acceleration and deceleration for a plurality of different times in the future. As noted above, this speed profile may be determined iteratively for a brief period of time (e.g., every second, or more or less, for the next 20 seconds, or more or less). As an example of a simple speed profile which ignores more complex factors, the vehicle's one or more computing devices may assume that the vehicle's current speed will continue (e.g., there will be no acceleration or deceleration) over the brief period or use the vehicle's current speed and acceleration and deceleration to estimate the vehicle's future speed.

A speed profile may also be determined using any number of additional constraints including, but not limited to, road speed limit, curvature along trajectory of the autonomous vehicle, minimum and maximum acceleration the autonomous vehicle can execute, smoothness of acceleration, as well as other traffic participants along the trajectory. For example, a speed profile may be determined by analyzing all such constraints for every second for the next 20 seconds or so as cost functions, where each cost function would be a lower value if the autonomous vehicle is in a desirable state and a higher value otherwise. By summing each of the cost function values, the computers may select the speed profile having the lowest total cost value. Non-linear optimization may allow for the determination of a solution in a short period of time.

In addition, a speed profile computed in a previous iteration of the decision logic may also be used to determine a current speed profile. This can save time for making the decision more quickly as the speed profile usually does only change little if the overall traffic situation does not change abruptly.

Using the speed profile, the vehicle's one or more computing devices may estimate a future location of the autonomous vehicle at the time when the traffic signal will change from the yellow light state to the red light state. For example, using the simplest speed profile (where the speed of the vehicle does not change) the future location may be determined by multiplying the speed of the vehicle by the difference between the current time and the estimated time when the traffic signal will change from the yellow light state to the red light state. Alternatively, if the vehicle's computer receives information identifying a future time when a traffic signal light will turn from yellow to red from another device, this future time may be used to estimate where the autonomous vehicle will be located when the traffic signal light will change from yellow to red.

Figure 6:
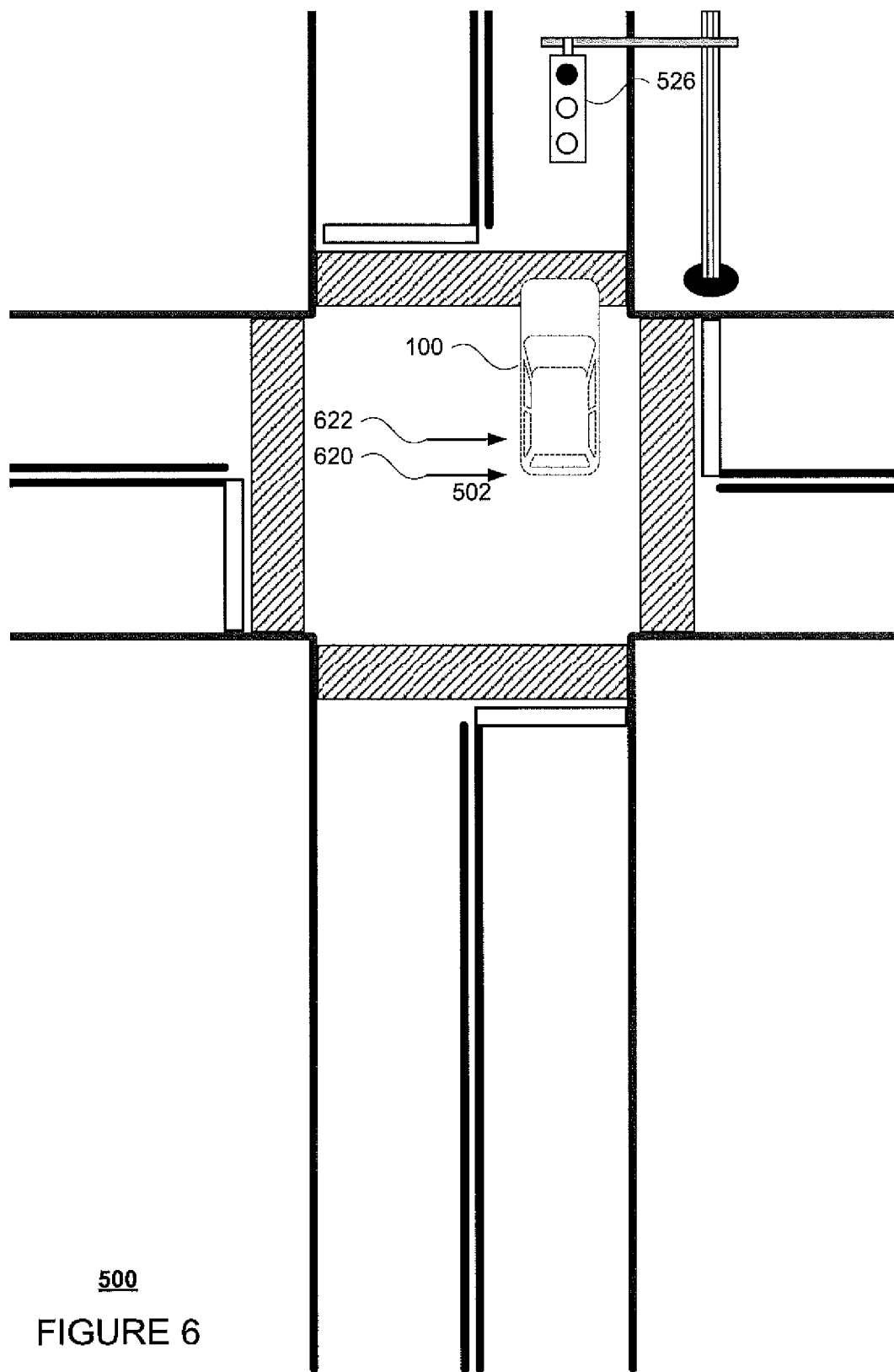
FIG. 6 is an example diagram of an expected location of a vehicle in accordance with aspects of the disclosure.

Of course, where the speed profile is more complex, estimating the future location may be simplified by finding the vehicle's average speed until the time when the traffic signal will change from the yellow light state to the red light state and multiplying this value by the difference between the current time and the estimated time when the traffic signal will change from the yellow light state to the red light state. Again, if the vehicle's computer receives information identifying a future time when a traffic signal light will turn from yellow to red from another device, this future time may be used to estimate where the autonomous vehicle will be located when the traffic signal light will change from yellow to red. FIG. 6 is an example of an estimated future location of vehicle 100 (shown in dashed line as it is an estimate) at the time when traffic signal 526 changes from the yellow light state to the red light state relative to the section of roadway 500.

The estimated future location may be determined using a reference location relative to the autonomous vehicle. For example, this reference location may be a most rear facing point on the vehicle 100, a point in the center or along a plane of a rear axle of the vehicle as indicated by arrow 622, point or plane of a rear bumper of the vehicle as indicated by arrow 620, etc. In some examples, the reference may be selected based upon a legal requirement, such as a requirement that a vehicle's rear wheels be within an intersection before a traffic signal turns red. In such an example, the point or reference may include a point on one of the rear tires or a plane extending between the rear tires as indicated by arrow 620.

The vehicle's one or more computing devices may also identify a starting point of an intersection associated with the relevant traffic signal. For example, as noted above, the detailed map information may include markers that define locations where the intersection starts and ends as well as threshold information. The relevant marker for an intersection may be the marker that the vehicle will pass before an intersection along a particular rail. Returning to FIG. 3, when traveling along rail 340 from point 1 towards intersection 302, the vehicle will first pass through marker 350. Thus, marker 350 may be the relevant marker for intersection 302.

Alternatively, the location of the intersection may be determined by the vehicle's computer using sensor information, such as data from a camera and/or laser, to detect typical features of an intersection such as a white stop line, the location of traffic signals, or locations at which one or more other roadways meeting with the roadway on which the vehicle is driving. This information may be used to identify a location defining a starting point for the intersection where the vehicle should stop, such as no further than the first traffic signal at an intersection.

Figure 7:
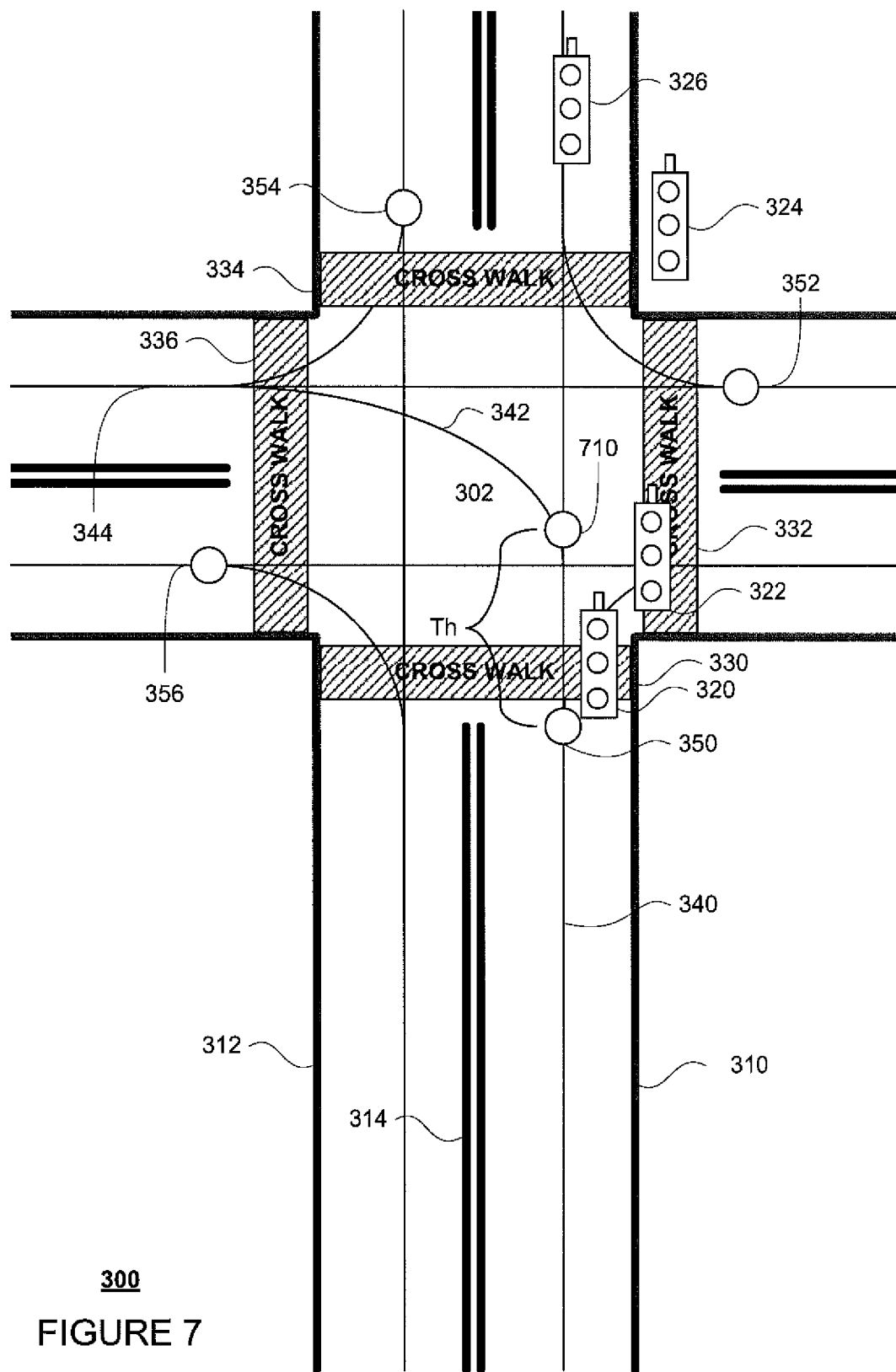
FIG. 7 is another example of detailed map information in accordance with aspects of the disclosure.

The vehicle's one or more computing devices may determine whether the vehicle, and in some cases the reference location of the vehicle, will be at least a threshold distance passed the starting point when the traffic signal will change from the yellow light state to the red light state. For example, the threshold distance may initially be a pre-determined distance, such as 5 meters or more or less, selected based upon the stopping power of the vehicle as in the example described above. For example, FIG. 7 is another example of the detailed map information 300 but includes reference point 710 indicating a threshold distance Th along the rail 340 passed marker 350.

Based on whether the estimated future location of the vehicle is determined to be at least the threshold distance past the starting point, the vehicle's one or more computing devices, may determine whether the vehicle should continue through the intersection. If the estimated future location is at least a threshold distance passed the location of the relevant marker (or at least a threshold distance into the intersection) the vehicle's one or more computing devices 110 may allow the vehicle to continue through the intersection. If not, the one or more computing devices 110 may stop the vehicle by the location of the marker.

Figure 8:
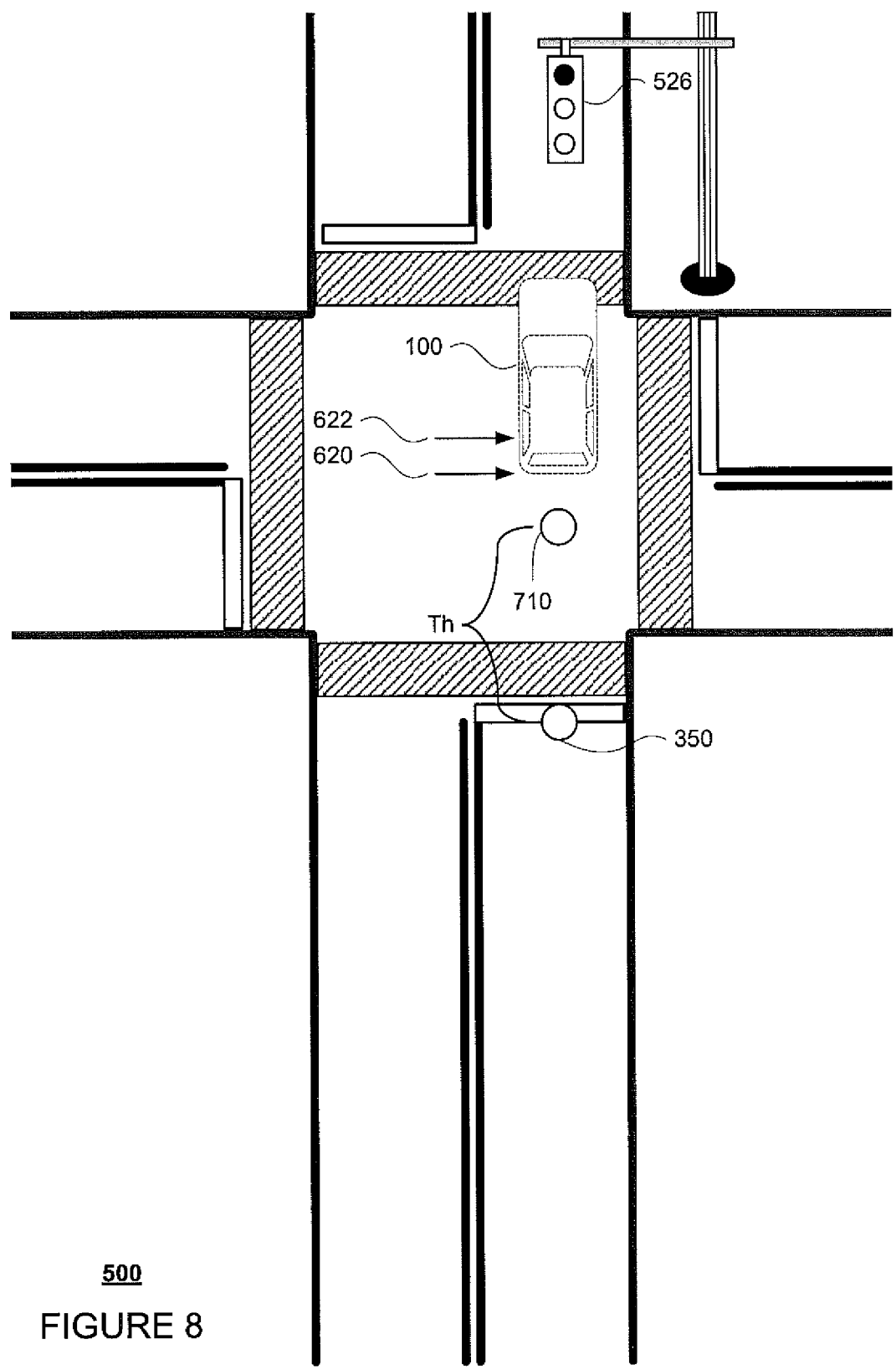
FIG. 8 is an example of detailed map information combined with an example diagram of a section of roadway including an intersection in accordance with aspects of the disclosure.

For example, FIG. 8 is an example of the section of roadway 500 including the future estimated location of vehicle 100 at the time when traffic signal 526 changes from the yellow light state to the red light state. However, this example also includes the location of marker 350 and reference point 710 of FIG. 7. Here, the future estimated location of vehicle 100 (even relative to the planes of arrows 620 and 622) is passed the reference point 710. In this regard, the vehicle's one or more computing devices may allow the vehicle to continue through the intersection. Similarly, if vehicle 100 were to not pass the location of reference point 710 by the time that the when traffic signal 526 changes from the yellow light state to the red light state, the vehicle's one or more computing devices may being the vehicle to a atop at or before the location of marker 350.

Figure 9:
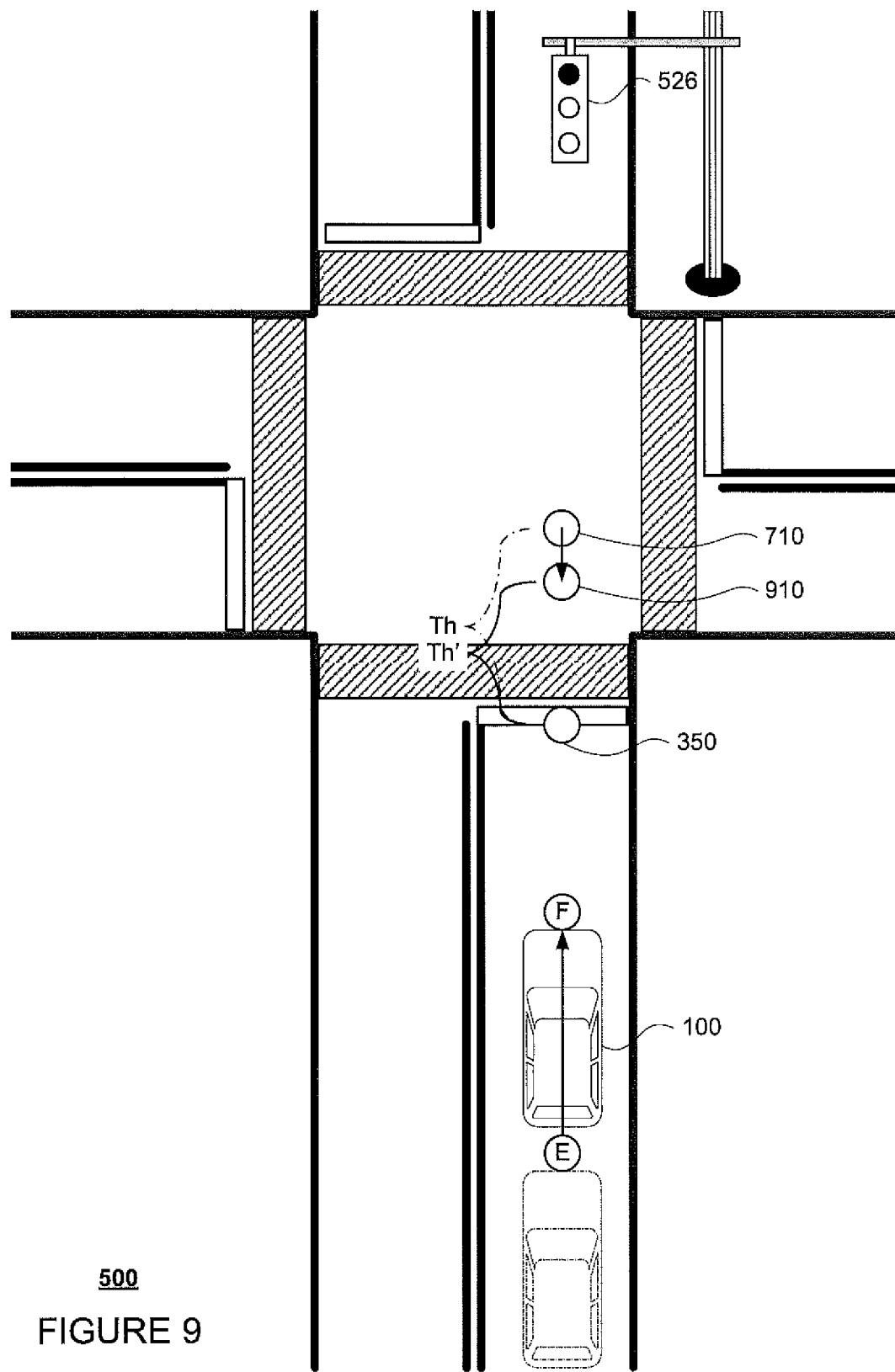
FIG. 9 is another example of detailed map information combined with an example diagram of a section of roadway including an intersection in accordance with aspects of the disclosure.

As the vehicle becomes closer to the intersection, because of the possibility of changes to the speed profile based on other factors (such as other vehicles, etc.), the threshold may actually decrease. For example, as shown in FIG. 9, as vehicle 100 approaches the intersection 502, the threshold distance Th may decrease to Th'. Thus, when vehicle 100 moves from the location of point E to the location of point F, the reference point 710 may be relocated to the location of reference point 910. Thus, as the vehicle 100 moves closer to the intersection 502, the vehicle need not be as far into the intersection 502 in order for the vehicle's one or more computing devices to allow the vehicle to continue through the intersection.

Figure 10:
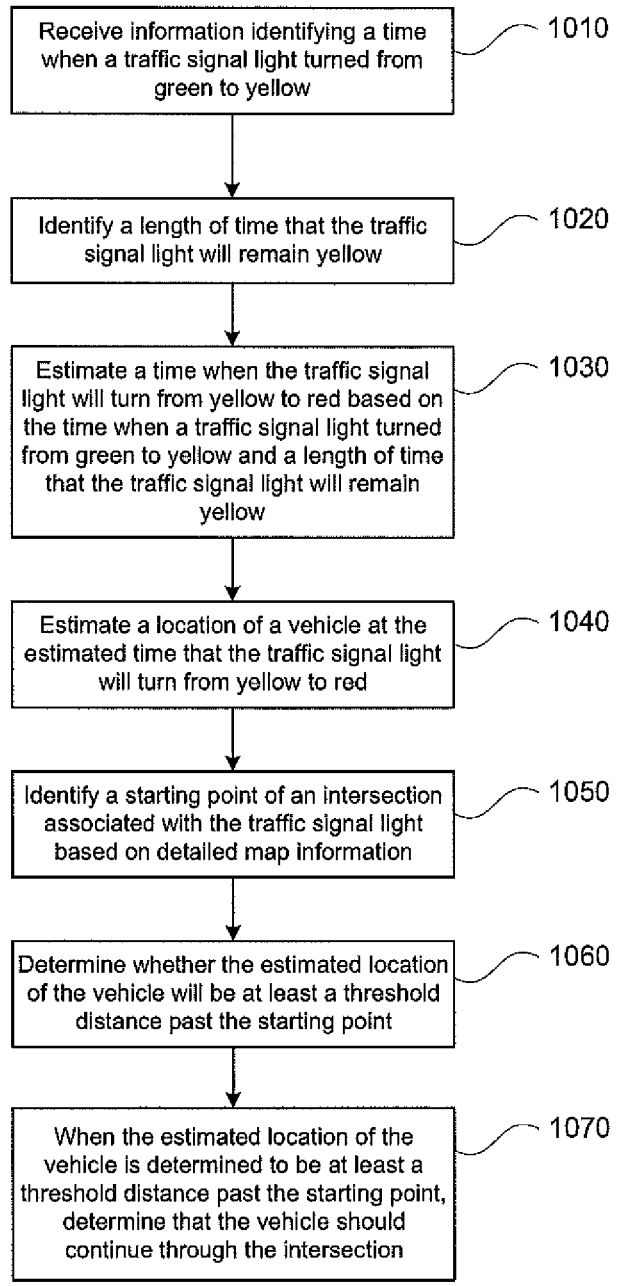
FIG. 10 is an example flow diagram in accordance with aspects of the disclosure.

FIG. 10 is an example flow diagram 1000 which depicts some of the aspects described above which may be performed by one or more computing devices such as one or more computing devices 110 of vehicle 100. In this example, the information identifying a time when a traffic signal light turned from green to yellow is received at block 1010. A length of time that the traffic signal light will remain yellow is identified at block 1020. A time when the traffic signal light will turn from yellow to red based on the time when a traffic signal light turned from green to yellow and a length of time that the traffic signal light will remain yellow is estimated at block 1030. A location of a vehicle at the estimated time that the traffic signal light will turn from yellow to red is estimated at block 1040. A starting point of an intersection associated with the traffic signal light based on detailed map information is identified at block 1050. Whether the estimated location of the vehicle will be at least a threshold distance past the starting point is determined at block 1060. When the estimated location of the vehicle is determined to be at least a threshold distance past the starting point, the vehicle should continue through the intersection is determined at block 1070.

In some examples, the traffic signal light may turn red before the estimated time that the traffic signal light will turn from red to yellow. This may be for various reasons such as a misclassification of the light color when determining the status of a traffic signal light, incorrectly identifying a length of time that a traffic signal will remain in the yellow light state, or simply because the timing of the particular traffic signal light includes some anomaly. In such a case, the vehicle's computing device may make the direct computation of whether the vehicle can be stopped in time without going too far into the intersection (e.g., not more than 1 meter or more or less for safety reasons), for example, using the braking power example described above.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle having an autonomous driving mode, the method comprising:
   determining, by one or more processors, a distance from the vehicle to an intersection;
   determining, by the one or more processors, a first state of a traffic signal when the vehicle is the distance from the intersection;
   determining, by the one or more processors, a time when the vehicle will enter the intersection based on a current speed of the vehicle and the distance;
   determining, by the one or more processors, a second state of the traffic signal at the time when the vehicle will enter the intersection based on the determined first state;
   determining, by the one or more processors, whether the vehicle should stop in response to the traffic signal or proceed through the intersection in the autonomous driving mode based on the determined second state; and
   controlling, by the one or more processors, the vehicle based on the determination of whether the vehicle should stop in response to the traffic signal or proceed through the intersection.

2. The method of claim 1, wherein the determined first state includes the traffic signal having an illuminated yellow light.

3. The method of claim 2, wherein the determined second state includes the traffic signal having an illuminated red light, and wherein controlling the vehicle includes stopping the vehicle before the intersection.

4. The method of claim 1, wherein the determined second state includes the traffic signal having an illuminated yellow light, and wherein controlling the vehicle includes proceeding through the intersection without stopping the vehicle.

5. The method of claim 1, wherein controlling the vehicle is further based on how much braking power would be required to stop the vehicle by the intersection based on the distance and the current speed of the vehicle.

6. The method of claim 5, further comprising, comparing the braking power to a threshold value to determine whether the vehicle should proceed through the intersection without stopping, and wherein controlling the vehicle is further based on the determination of whether the vehicle should proceed through the intersection without stopping.

7. The method of claim 6, wherein when a result of the comparing indicates that the braking power is greater than the threshold value, controlling the vehicle includes proceeding through the intersection without stopping the vehicle.

8. The method of claim 6, wherein when a result of the comparing indicates that the braking power is less than the threshold value, controlling the vehicle includes stopping the vehicle before the intersection.

9. The method of claim 1, further comprising identify a time when the traffic signal will change state, and wherein controlling the vehicle is further based on the time when the traffic signal will change state.

10. The method of claim 1, wherein the determined first state is same as the determined second state.

11. The method of claim 1, wherein the determined second state is different from the determined first state.

12. The method of claim 1, further comprising, identifying a length of time that the traffic signal will remain in the determined first state, and wherein controlling the vehicle is further based on the length of time.

13. The method of claim 12, wherein the length of time is based on a default estimation time.

14. The method of claim 12, wherein the length of time is based on a speed limit for a road on which the vehicle is traveling.

15. The method of claim 12, wherein the length of time is received from a device remote from the vehicle.

16. The method of claim 12, wherein determining the second state is further based on the length of time.

17. The method of claim 1, wherein determining the time is further based on a speed profile of the vehicle and the distance, wherein the speed profile identifies an expected future speed of the vehicle.

18. The method of claim 17, wherein the speed profile further identifies a future acceleration of the vehicle.

19. The method of claim 17, wherein the speed profile further identifies a future deceleration of the vehicle.

20. The method of claim 17, further comprising, determining the speed profile based on a combination of a road speed limit, curvature along a trajectory of the vehicle, minimum and maximum acceleration the vehicle can execute, and smoothness of acceleration.

21. A system for controlling a vehicle having an autonomous driving mode, the system comprising one or more processors configured to:

determine a distance from the vehicle to an intersection;

determine a first state of a traffic signal when the vehicle is the distance from the intersection;

determine a time when the vehicle will enter the intersection based on a current speed of the vehicle and the distance;

determine a second state of the traffic signal at the time when the vehicle will enter the intersection based on the determined first state;

determine whether the vehicle should stop in response to the traffic signal or proceed through the intersection in the autonomous driving mode based on the determined second state; and control the vehicle based on the determination of whether the vehicle should stop in response to the traffic signal or proceed through the intersection.

22. The system of claim 21, wherein the determined first state includes the traffic signal having an illuminated yellow light, and wherein controlling the vehicle includes proceeding through the intersection without stopping the vehicle.

23. The system of claim 21, wherein the one or more processors are configured to control the vehicle further based on how much braking power would be required to stop the vehicle by the intersection based on the distance and the current speed of the vehicle.

24. The system of claim 22, further comprising the vehicle.

* * * * *